Dec. 29, 1925.
A. C. BUENSOD
1,567,031
PROCESS FOR TREATING HYGROSCOPIC MATERIALS
Filed Dec. 30, 1921  2 Sheets-Sheet 1
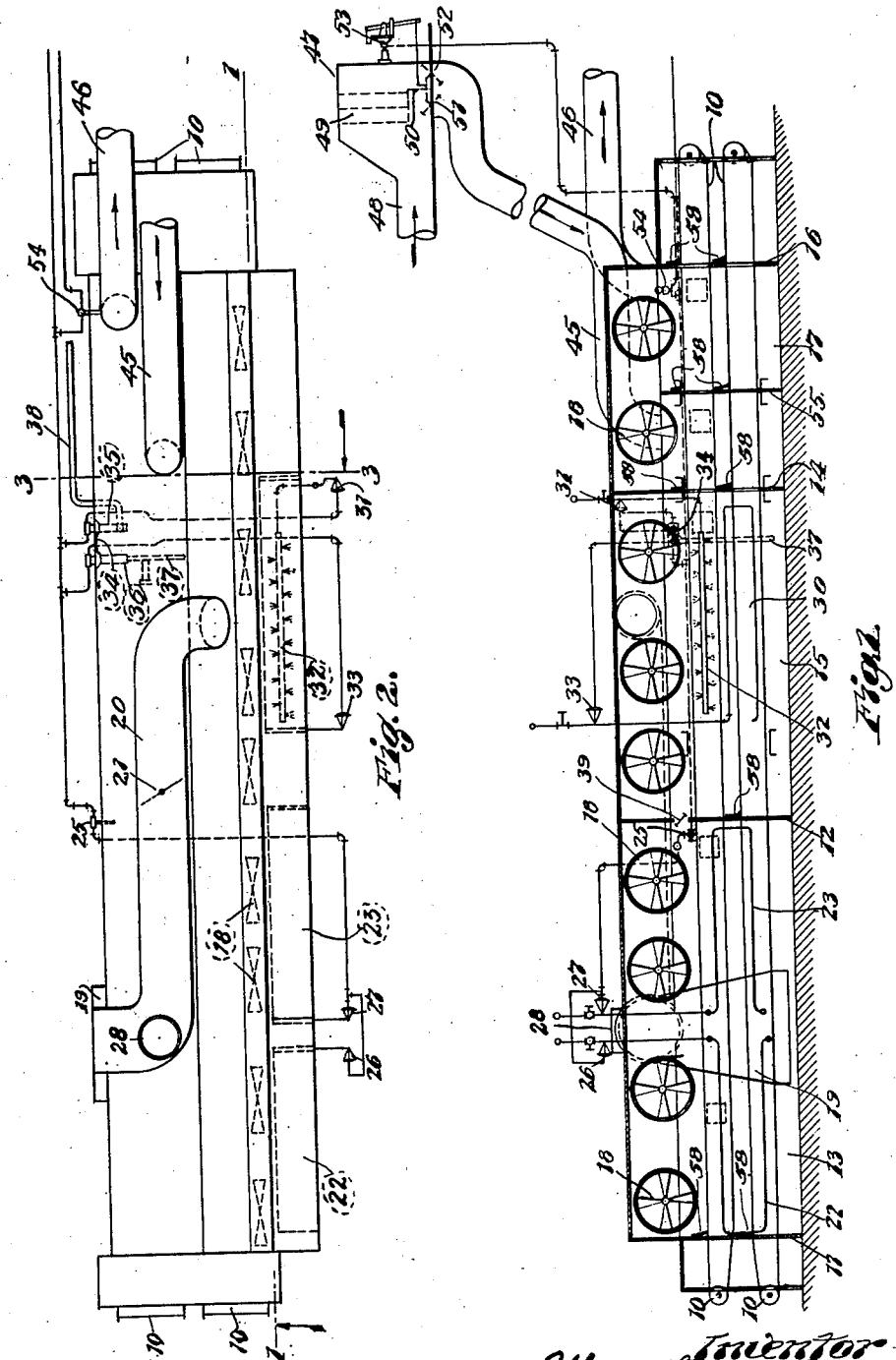

Dec. 29, 1925.  1,567,031
A. C. BUENSOD
PROCESS FOR TREATING HYGROSCOPIC MATERIALS
Filed Dec. 30, 1921   2 Sheets-Sheet 2

Patented Dec. 29, 1925.

1,567,031

UNITED STATES PATENT OFFICE.

ALFRED CHARLES BUENSOD, OF NEW YORK, N. Y., ASSIGNOR TO CARRIER ENGINEERING CORPORATION, OF NEW YORK, N. Y., A CORPORATION OF NEW YORK.

PROCESS FOR TREATING HYGROSCOPIC MATERIALS.

Application filed December 30, 1921. Serial No. 525,997.

*To all whom it may concern:*

Be it known that I, ALFRED CHARLES BUENSOD, a citizen of the United States of America, and a resident of the city, county, and State of New York, have invented certain new and useful Improvements in Processes for Treating Hygroscopic Materials, of which the following is a full, clear, and exact description.

My invention relates generally to a process for treating hygroscopic materials, and more particularly to such a process in which the materials are passed, preferably in a drier of the tunnel type, continuously or periodically through the drier from one end to the other.

The principal object of my invention has been to provide a process by which a hygroscopic product (such as tobacco or silk) may have a regulated and definite moisture content or regain at the exit end of the drier irrespective of the amount of moisture content of the material introduced into the drier and also irrespective of the speed at which the product is dried.

In general, my process comprises the passage of the material through a chamber or compartment which is provided with heating means preferably controlled automatically. In this chamber the material is maintained at the proper temperature as it is continuously passing therethrough. The material is then passed into and through a second chamber or compartment which is also provided with heating means, and in addition to these means, moistening means are also provided. These moistening means may be sprays of water or jets of steam located in the chamber, or moist air supplied to the chamber from suitable moistening means or moist air taken from the first chamber. The control of temperature and moisture content is also preferably automatic. From the second chamber, the material is passed on into and through a third chamber, where it is subjected to relatively cool, moist air, having a temperature preferably only slightly above that of the room atmosphere. The air supplied to this third chamber is preferably saturated and the temperature and relative humidity thereof changed preferably by means of heaters. An automatic control for the temperature and moisture content is provided for this chamber. All the automatic means are adjusted so that the finished product, as it emerges from the last chamber, will have the desired moisture content or regain.

While I have shown and described my process as capable of being carried out by the use of three chambers or three progressive stages, still it will be obvious to those skilled in the art that my invention can be practiced by employing only two chambers or stages or by employing more than three such chambers or stages.

In the accompanying drawings, forming a part of this application, I have shown one type of tunnel drier which may be used in carrying out my process, it being obvious that many other forms of driers and arrangements of parts might be used with equal efficiency.

In the drawings:

Fig. 1 shows a longitudinal sectional view of the drier, taken on line 1—1 of Fig. 2.

Fig. 2 is a plan view thereof.

Figure 3:
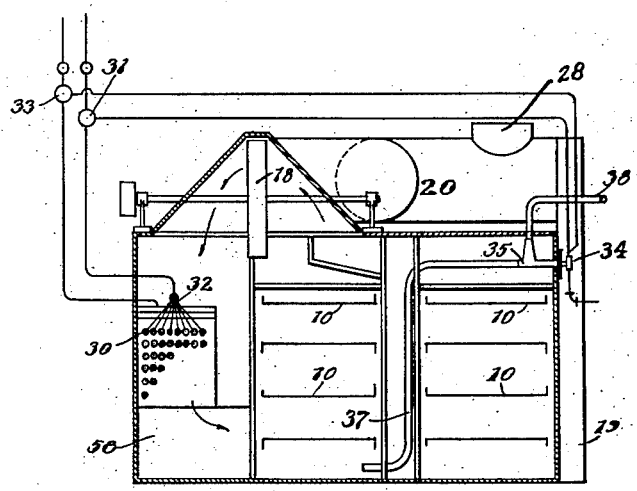
Fig. 3 is a sectional view taken on line 3—3 of Fig. 2.

The drier is of the tunnel type, having suitable conveying means 10, which are mounted upon suitable pulleys and idlers, as shown in the drawings, and provided with some suitable means for moving them. 11 is the end wall of the drier, at the entrance end thereof. 12 is a partition arranged within the drier and forming, with the end wall 11, a chamber 13. Another partition 14 is provided, which, with the partition 12, forms a chamber 15. 16 is the end wall of the chamber at the exit end thereof, and forms, with the partition 14, a chamber 17. Arranged along the top of these chambers and inclosed within the same, are a plurality of fans 18, which are provided with suitable means for driving the same (not shown), whereby the conditioned air within the chambers is caused to be circulated through and between the material suspended and passing through the chambers.

Arranged at one side of chamber 13, and preferably midway of its length, is an offset compartment 19, whereby air may be taken from chamber 13 at all elevations thereof. A pipe 20, having a damper 21, is connected at one end to the offset compartment 19 of chamber 13 and at its other end to the chamber 15, whereby the damp air from chamber 13 may be conducted to chamber 15. A branch opening 28 is provided in the pipe 20 through which some of the moist air may be removed from the chamber 13.

The chamber 13 is provided with heating means, preferably in the form of steam heating coils 22 and 23. These coils are preferably divided midway the length of this chamber, and they may be controlled automatically by means of a thermostat 25. This thermostat is arranged preferably near the exit end of this chamber, so that the temperature of the air after it has passed between and in contact with the material will actuate the thermostat, (which has been set at a predetermined temperature), and it in turn will regulate the heating effect of the coils. Diaphragm valves 26 and 27 are provided, and are connected with the thermostat 25, and this valve controls the supply of steam to the steam coils 22 and 23, respectively.

The chamber 15 is provided with both heating means and moistening means. The heater 30, which is preferably of the pipe coil type, is supplied with steam, the flow of which is controlled by the valve 33. The moistening means comprises preferably a pipe 32, which is perforated at intervals, and through which fluid, controlled by the valve 31, is supplied. This moistening fluid may be in the form of water or steam. A regulator 34 having a wet bulb 35 and a dry bulb 36 is provided for controlling the conditions within the chamber 15. The valve 31 is connected to the wet bulb 35 and a valve 33 is connected to the dry bulb 36. The regulator 34 is a standard instrument and is of the type in which samples of air being tested are drawn first over the dry bulb and then over the wet bulb. In order to accomplish the sampling of the air in this chamber, a pipe 37 extends down through the center of the chamber and has its inlet end arranged preferably below the product being dried. The upper end of this pipe is connected so that the air is drawn over the dry bulb 36 and then drawn over the wet bulb 35. A pipe 38, which is connected with any suitable suction means, causes the samples of air to be drawn through the instrument. As hereinbefore stated, the damp air taken from chamber 13 is passed through the pipe 20 and discharged into the chamber 15, whereby it is not necessary to supply a great deal of moisture through the pipe 32. A damper 39 is also provided in the partition 12, so that the moisture laden air from chamber 13 may also pass into chamber 15.

Figure 4:
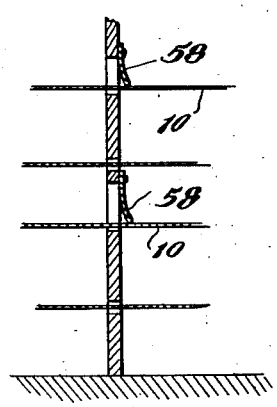
Fig. 4 is an enlarged, fragmentary, sectional view through one of the partitions, showing one of the flaps 58.

The chamber 17 is the last chamber through which the material passes before it is discharged from the apparatus, and this chamber is provided with neither heating nor moistening means. It is, however, provided with an inlet pipe 45 and an outlet pipe 46. The inlet pipe and outlet pipe are connected with any suitable apparatus for producing relatively cool, moist air, or air having a low dew point. The temperature of the air is preferably controlled by means of a heater 47, which is arranged between the pipe 48 coming from the moistening apparatus and pipe 45 leading to the chamber 17. This heater is provided with any suitable heating means 49, and with a partition 50, whereby air may either pass through the heating means 49 or directly to the pipe 45. Dampers 51 and 52 are provided, whereby all of the air or portions thereof may be by-passed through the heating means 49. An air motor 53 is provided, which controls the positions of the dampers 51 and 52. The chamber 17 is provided with a hygrostat 54 which is arranged near the exit end thereof, and which is actuated by the moisture content of the air after it leaves the products being treated. The hygrostat by being connected to the air motor 53 controls the amount of heated air supplied to the chamber 17, and, therefore, the temperature of the air within the chamber. This hygrostat is preferably arranged beneath the discharge pipe 46, so that it is controlled by the conditions of the product being treated as it leaves the chamber 17. A partition 55 is provided in chamber 17, preferably midway its length. This partition does not extend to the extreme top of the chamber, but serves to divide the chamber into two separate compartments which will be separately treated by the same air. It will be understood that the openings in the partitions of the apparatus through which the conveyors and the product pass may be provided with any suitable means for effectively closing the openings, such as canvas flaps 58 or the like (see Fig. 4). A plurality of hand holes 62 are preferably provided throughout the length of the apparatus, whereby the material being dried may be sampled.

As shown in Fig. 3, I employ four conveyors, suitably arranged within the drier. At the side of these conveyors is a space 58 in which the heating means and moistening means are preferably arranged. The fans are arranged at one side and above this space, and serve to draw the air surrounding the conveyors and preferably force it downwardly through the heating or moistening means, and thereby cause it to be circulated between and in contact with the surfaces of the material supported by the conveyors.

In carrying out my process, the material is supported from suitable frames by the conveyors or placed directly upon the exposed end of the conveyors at the entrance end of the drier and is fed either continuously or periodically into the same. As the material enters the chamber 13, it is subjected to heat which is supplied preferably by means of the heaters 22 and 23, there being no attempt toward moisture control in this chamber. As hereinbefore pointed out, the thermostat 25 is arranged near the end of the chamber and in a position where it will be subjected to the air that has passed between and has come in contact with the material which is just leaving the chamber.

After the material has been treated in chamber 13, it passes through partition 12 and into chamber 15. Here it is subjected to heat from the heater 30, and also to moisture in the form of sprays of water or jets of steam from the pipe 32. The material is also subjected in this chamber to moist air from chamber 13, which is conducted from chamber 13 to chamber 15 through the pipe 20, or through the passage controlled by the damper 39. Since the material is subjected to moisture as well as heat, the dry bulb 36 and wet bulb 35 are utilized to control the conditions within this chamber. The regulator 34 is arranged near the exit end of the chamber 15, where it will be subjected to air conditions which represent very closely the condition of the tobacco as it leaves the chamber. This is brought about because the air by passing continuously through the chamber end coming in contact with the material brings the material up to the predetermined condition. In chamber 15, I have found it is preferable to maintain a fixed wet bulb depression such as would normally reduce the moisture content to a point which would be below the moisture content or regain desired in the finished product as it leaves chamber 17. For example, if it were desired to have a moisture content of ten per cent when the product being treated leaves the drier, it is desirable to have the conditions within chamber 15 so regulated that it will leave this chamber and enter chamber 17 having a moisture content of seven or eight per cent. Thus, it will be necessary to supply only two or three per cent additional moisture content to the material in the last chamber or chamber 17.

A large amount of the moisture carried by the air in the chamber 15 is supplied by the material which is being treated in the chamber; and, in case the relative humidity of the air in the chamber is too great, the moistening means would be shut off and the relative humidity reduced by the normal leakage of the air from the chamber.

As the material leaves chamber 15, it passes through partition 14 and enters chamber 17. As the materials pass into the chamber 17, it is necessary to cool such materials to a temperature substantially the same as that prevailing in chamber 17. These chambers are preferably separated as completely as possible, and in chamber 17 the material is subjected to relatively cool air, which has been previously saturated and its temperature and relative humidity controlled by suitable heating means, such as the heater 47. The chamber 17 is subjected to cool, saturated air which has a dew point lower than the dew point of the air in the chamber 15, but having a relative humidity which is higher than that of chamber 15. Since the saturated air which is blown into the chamber 17, after recirculating through the chamber one or more times will assume a condition closely corresponding to that of the material, the hygrostat 54 is placed at the exit end of the chamber, so that the conditions within the chamber will be governed by the condition of the product being treated as it leaves the chamber. The control in the chamber 17 preferably operates to raise the temperature of the air before or as it enters the chamber while maintaining it at a constant dew point. If the temperature of the air is raised, the relative humidity is lowered, and it will not tend to add moisture to the material, while if no heat is added to the air it will add moisture to the material as required. This forms a very efficient means of regulating the moisture or drying effect of the air in the final chamber 17. The temperature in chamber 17 is much lower than that of chambers 13 and 15, and it is preferably only slightly above the temperature of the room, so that the material when it comes out of the drier will have practically the same temperature as that of the room, and, therefore, will not lose its moisture by evaporation when cooling. It is well known that when material is absorbing moisture it gives off a corresponding amount of heat, so that the material itself serves to heat the air and lower its relative humidity by temperature, as well as by absorption. For this reason, a volume regulation could be used advantageously to control the temperature and relative humidity within the chamber 17 instead of the heating means shown and described. The heater control, however, is preferable since it provides more accurate regulation and permits of drying the material as well as moistening it. The volume regulation does not permit drying the material but is almost entirely limited to moistening it. Such a volume regulation may be accomplished by providing a damper 60 which is controlled by an air motor 61, operated by the hygrostat 54, for regulating the amount of conditioned air allowed to pass into the chamber. It is obvious that such a volume regulation is not suitable for drying the material for the reason that there would be no source of heat to lower the relative humidity. As hereinbefore stated, it is preferable to maintain a moisture content in the material leaving the chamber 15 which is two or three per cent lower than that which is required in the finished product. This has the effect of maintaining active drying of the material and carrying the more exposed portions below the moisture content desired. It also brings the average moisture content slightly below that required, although some portion of the material may have a greater moisture content than others.

I have found that the air after passing over and in contact with the material one or more times will assume a relative humidity corresponding to the moisture content of the material itself. It is well known that the moisture content of any hygroscopic material will correspond to a definite relative humidity of the air in contact with such material. I have also found that if the relative humidity of the air after having come in contact with the material one or more times is regulated for some predetermined relative humidity, the moisture content of the material will be fixed at the desired percentage which will correspond to the predetermined relative humidity. This is the principle of the control which I have employed in my process. Throughout the specification and claims, wherever the term "conditioned" is employed as applied to air, I mean such air as has been so treated as to have a predetermined temperature and moisture content.

It will be noted that the conditioned air and the material are introduced into the chamber at the same end and that the general course of travel of the forced currents of conditioned air is substantially coincident with the direction of travel of the material being treated. The fans provided in each chamber drive the air in the chamber between and in contact with the material in cross currents; and, as the material travels through the chamber, the air will be forced to come into contact with it one or more times. At the opposite end of the chamber the air and the material will be discharged, and it is at this point (after the air has come in contact with the material for the last time) that the control instrument or instruments are located. Therefore, the moisture content of the material being treated at the exit end of the chamber will correspond to the predetermined relative humidity of the air at this point.

In practice, I have found that where my process is employed the moisture content of the materials being treated can be fixed at any desired predetermined percentage and that the automatic regulation is so sensitive that the variation from such predetermined percentage will not be more than one-half of one per cent. Thus, I am able to secure in a finally treated material any desired percentage of moisture content.

Obviously some modifications may be made without departing from the spirit of my inventions or the scope of the appended claims; and, therefore, I do not wish to be understood as defining only the exact way in which the process may be carried out.

I claim—

1. A process for progressively treating hygroscopic materials, comprising the subjection of the materials being treated to conditioned air during the preliminary stages of treatment, and then fixing the final desired condition of the materials by means of and in accordance with the condition of the air during the final stage of treatment.

2. A process for progressively treating hygroscopic materials, comprising the subjection of the materials being treated to comparatively dry air during the first stage of treatment, and then fixing the moisture content of such materials at any desired stage of the treatment by means of the predetermined temperature and relative humidity of the air, after it has come in contact with the materials during that stage of the treatment.

3. A process for progressively treating hygroscopic materials, comprising the subjection of the materials being treated to comparatively dry air, the temperature of which alone is controlled, and then subjecting the materials to conditioned air the temperature and the moisture content of which are both controlled.

4. A process for progressively treating hygroscopic materials, comprising the subjection of the materials being treated to previously saturated air having a substantially fixed dew point and a variably increased temperature which corresponds to the moisture content of the materials after the air has come in contact with the materials one or more times.

5. A process for progressively treating hygroscopic materials, comprising the subjection of the materials being treated to comparatively dry air having a relatively high temperature which alone is controlled during the first stage of treatment, and then subjecting the materials to conditioned air having a lower temperature and higher moisture content during the succeeding stages of treatment.

6. A process for progressively treating hygroscopic materials, comprising the passage of the materials and conditioned air through a plurality of treating chambers in the same direction and causing the air to come into contact with the materials one or more times in each chamber, and then predetermining the desired relative humidity of the air which is in contact with the materials in the last of such chambers, thereby fixing the desired moisture content of the materials after they have been treated.

7. A process for progressively treating hygroscopic materials, comprising the subjection of the materials being treated to conditioned air of high temperature and high moisture content, and then subjecting the materials to air having a lower temperature and moisture content but higher relative humidity.

8. A process for progressively treating hygroscopic materials, comprising the subjection of the materials being treated to conditioned air having a fixed high temperature and high moisture content whereby the moisture content of the materials is substantially lower than finally desired, then subjecting the materials to conditioned air having a predetermined lower temperature and a low moisture content but higher relative humidity, whereby the final moisture content of the materials is increased to the desired fixed amount.

9. A process for progressively treating hygroscopic materials, comprising the subjection of the materials being treated to conditioned air during the preliminary stages of treatment, and then subjecting the materials to relatively cool, moist air during subsequent stages of treatment.

10. A process for progressively treating hygroscopic materials, comprising first the subjection of the materials beng treated to conditioned air during the preliminary stages of treatment, then subjecting the materials to relatively cool, moist air, and then, during the final treatment, fixing the condition of the materials by means of the conditioned air.

11. A process of progressively treating hygroscopic materials, comprising the subjection of the materials being treated to conditioned air, and then subjecting the materials to conditioned air having a lower temperature and moisture content but a higher relative humidity than the conditioned air first mentioned.

12. A process for progressively treating hygroscopic materials, comprising the subjection of the materials being treated to conditioned air, and then subjecting the materials to previously saturated air having a relatively low fixed dew point.

13. A process for progressively treating hygroscopic materials, comprising the subjection of the materials being treated to conditioned air, and then subjecting the materials to previously saturated air having a temperature substantially the same as that of the outside air and a fixed dew point lower than the air first mentioned.

14. A process for progressively treating hygroscopic materials, comprising the subjection of the materials being treated to conditioned air during the preliminary stages of treatment, and then adding moisture to the materials during the final treatment by means of onditioned air.

15. A process for progressively treating hygroscopic materials, comprising the subjection of the materials being treated to conditioned air during the preliminary stages of treatment, the temperature and relative humidity of which are controlled, then adding moisture to the materials during the final treatment by means of relatively cooler, moist air, and fixing the final desired condition of the materials by means of the last mentioned air by automatically controlling the relative humidity of the air during the final stage of treatment.

16. A process for progressively treating hygroscopic materials, comprising the subjection of the materials being treated to conditioned air during the prelimnary stages of treatment, and then during subsequent stages of treatment subjecting the materials to previously saturated air, having a fixed dew point and controlling the temperature of the air so that the final, desired condition of the materials is fixed by the condition of the air.

17. A process for progressvely treating hygroscopic materials, comprising the subjection of the materials being treated to conditioned air during the preliminary stages of treatment, and then during subsequent stages of treatment subjecting the materials to prevously saturated air and predetermining the relative humidity of the air by controlling its temperature, so that the final, desired condition of the materials is fixed by the condition of the air.

18. A process for progressively treating hygroscopic materials, comprising the subjection of the materials to air currents in which the temperature alone is controlled, then subjecting the materials to air currents in which the temperature and relative humidity are controlled, and then subjecting the material to air currents in which the temperature alone is controlled.

19. A process for progressively treating hygroscopic materials, comprising the subjection of materials to air currents in which the temperature alone is controlled, then subjecting the materials to air currents. having a lower temperature and a higher relative humidity than the air currents first mentioned, and then subjecting the materials to air currents having a higher relative humidity than the air currents last mentioned.

20. A process for progressvely treating hygroscopic materials, comprising the subjection of materials to air currents in which the temperature alone is controlled during the preliminary stage of treatment, then during a subsequent stage of treatment subjecting the materials to air currents, having a lower temperature and a lower moisture content but a higher relative humidity than the air currents first mentioned, and then during the final stage of treatment subjecting the materials to air currents having a higher relative humidity than the air currents last mentioned.

21. A process for progressively treating hygroscopic materials, comprising the subjection of the materials being treated to comparatively dry air, the temperature of which alone is controlled, then reducing the moisture content of such materials below that desired in the finished materials by means of conditioned air, and then adding to the moisture content of such materials as they are finally treated by means of conditioned air.

22. A process for progressively treating hygroscopic materials, comprising the subjection of the materials being treated to comparatively dry air currents, the temperature of which alone is controlled, then subjecting the materials to air currents having a lower temperature and a higher relative humidity than the air currents first mentioned, and then subjecting such materials to air currents having a lower temperature and a higher relative humidity than the air currents last mentioned.

23. A process of progressively treating hygroscopic materials, comprising the subjection of the materials being treated to comparatively dry air currents during the preliminary stages of treatment, the temperature of which alone is controlled, then during the subsequent stage of treatment subjecting the materials to air currents having a lower temperature and a higher relative humidity than the air currents first mentioned, then during the next stage of treatment supplying saturated air having a fixed dew point, and the final temperature of this saturated air after coming in contact with the material for the last time being regulated at a predetermined temperature.

24. A process for progressively treating hygroscopic materials, comprising the subjection of the materials to air currents having a high temperature and a comparatively low moisture content, then subjecting the materials to air currents having a lower temperature and high moisture content, and then subjecting the materials to air currents having a lower temperature and a lower moisture content but a higher relative humidity.

25. A process for progressively treating hygroscopic materials, comprising the subjection of the materials to air currents having a high temperature and a comparatively low moisture content during the preliminary stage of treatment, then during a subsequent stage of treatment subjecting the materials to air currents having a lower temperature and high moisture content, and then during subsequent stages of treatment subjecting the materials to air currents having a lower temperature and a lower moisture content but a higher relative humidity, the temperature, moisture contents, and relative humidities of the air being automatically controlled and predetermined as desired.

26. A process for progressively treating hygroscopic materials, comprising the subjection of the materials to air currents having a high temperature and a comparatively low moisture content during the preliminary stage of treatment, then during a subsequent stage of treatment subjecting the materials to air currents having a lower temperature and high moisture content, and then during subsequent stages of treatment subjecting the materials to air currents having a lower temperature and a lower moisture content but a higher relative humidity, the conditions of the materials being fixed by means of the predetermined temperature, moisture contents, and relative humidities of the air during each stage of the treatment.

27. A process for progressively treating hygroscopic materials, comprising the subjection of the materials to air currents ultimately moving substantially in the same direction as the material, causing said air currents to come in contact with and between the materials one or more times, thereby obtaining an interchange of moisture between the air and the materials, controlling such interchange by varying the relative humidity of the air currents initially in contact with the materials, such variation being governed by the final relative humidity of the air currents after last coming in contact with the materials.

28. A process for progressively treating hygroscopic materials, comprising the subjection of the materials substantially to saturated air currents of a fixed dew point ultimately moving substantially in the same direction as the material, causing said air currents to come in contact with and between the materials one or more times, thereby having the materials absorb moisture from said air and simultaneously controlling the regain in the materials by varying the temperature to which the saturated air currents of a fixed dew point are heated prior to their initial contact with the material, such variation being governed by the final relative humidity of the air currents after last coming in contact with the materials.

29. A process for progressively treating hygroscopic materials, comprising the subjection of the materials to air currents of a fixed dew point ultimately moving substantially in the same direction as the material, causing said air currents to come in contact with and between the materials one or more times, thereby having the materials absorb moisture from said air and simultaneously controlling the regain in the materials by varying the volume of such saturated air of fixed dew point coming in contact with the materials, such variation being governed by the final relative humidity of the air currents after last coming in contact with the materials.

30. A process for progressively treating hygroscopic materials, comprising the subjection of the materials to air currents of a constant wet bulb temperature and a variable dry bulb temperature ultimately moving substantially in the same direction as the material, causing said air currents to come in contact with and between the materials one or more times, thereby obtaining an interchange of moisture between the air and the materials and simultaneously controlling such interchange by the dry bulb temperature of the air currents initially in contact with the materials while maintaining substantially a constant wet bulb temperature throughout the treatment, such variation being governed by the final dry bulb temperature of the air currents after last coming in contact with the materials.

31. A process for progressively treating hygroscopic materials, comprising the subjection of the materials to air currents ultimately moving substantially in the same direction as the material, causing said air currents to come in contact with and between the materials one or more times thereby obtaining an interchange of moisture between the air and the materials, controlling such interchange by regulating the final dry and wet bulb temperatures of the air currents after last coming in contact with the materials in decreasing or increasing the moisture content of the air currents initially in contact with the materials.

In testimony whereof, I have hereunto signed my name.

ALFRED CHARLES BUENSOD.

Certificate of Correction.

It is hereby certified that in Letters Patent No. 1,567,031, granted December 29, 1925, upon the application of Alfred Charles Buensod, of New York, N. Y., for an improvement in "Processes for Treating Hygroscopic Materials," an error appears requiring correction as follows: In the drawings, Sheet 1, containing Figures 1 and 2, should appear as shown below instead of as shown in the drawings:

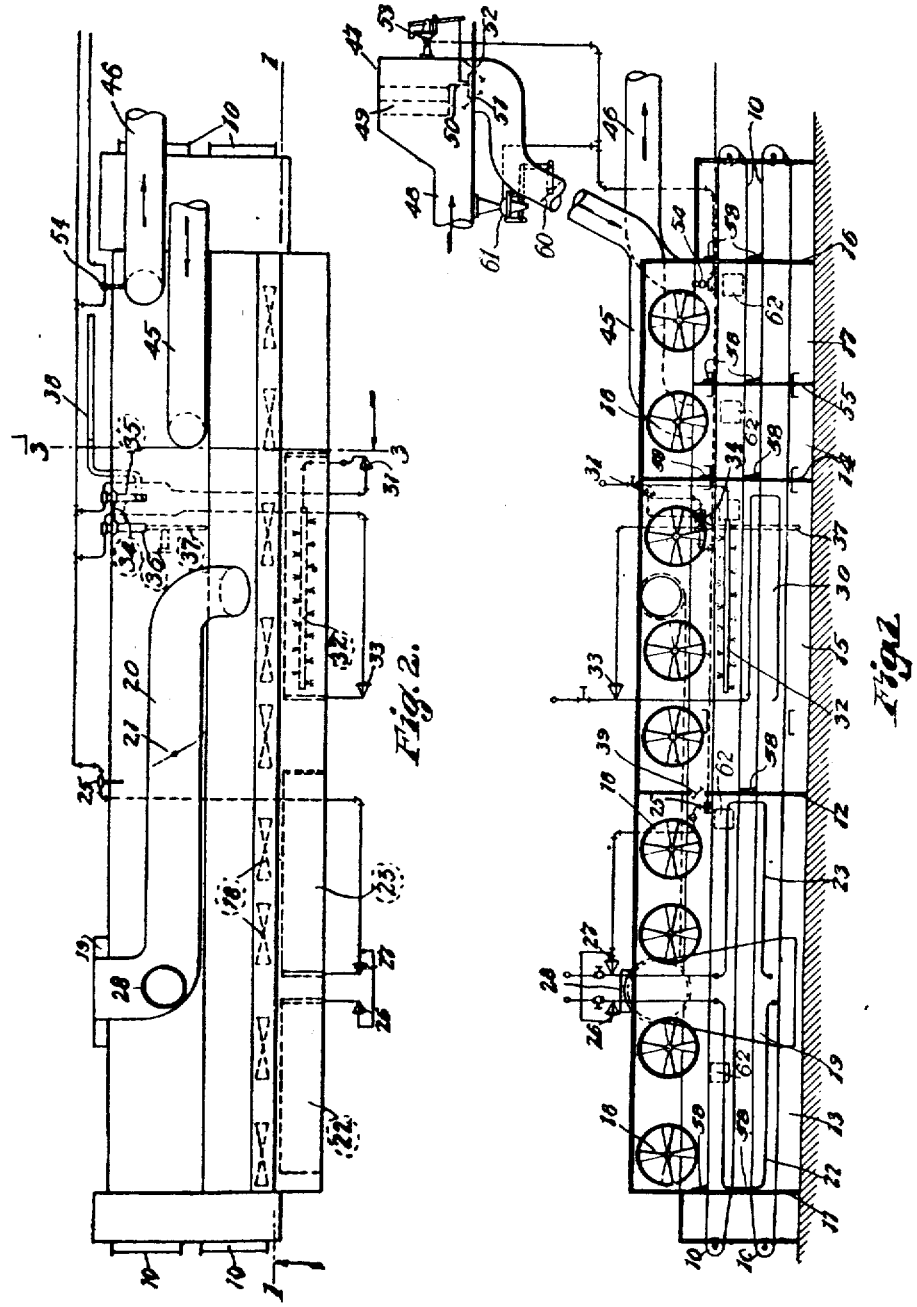

and that the said Letters Patent should be read with this correction therein that the same may conform to the record of the case in the Patent Office.

Signed and sealed this 4th day of January, A. D. 1926.

[SEAL.]
M. J. MOORE,
*Acting Commissioner of Patents.*